US012338517B2

(12) United States Patent
Gunnarsson et al.

(10) Patent No.: US 12,338,517 B2
(45) Date of Patent: Jun. 24, 2025

(54) STAINLESS STEEL AND A CUTTING TOOL BODY MADE OF THE STAINLESS STEEL

(71) Applicant: UDDEHOLMS AB, Hagfors (SE)

(72) Inventors: Staffan Gunnarsson, Uddeholm (SE); Magnus Tidesten, Hagfors (SE)

(73) Assignee: UDDEHOLMS AB, Hagfors (SE)

( * ) Notice: Subject to any disclaimer, the term of this patent is extended or adjusted under 35 U.S.C. 154(b) by 1067 days.

(21) Appl. No.: 15/111,695

(22) PCT Filed: Dec. 30, 2014

(86) PCT No.: PCT/SE2014/051578
§ 371 (c)(1),
(2) Date: Jul. 14, 2016

(87) PCT Pub. No.: WO2015/108466
PCT Pub. Date: Jul. 23, 2015

(65) Prior Publication Data
US 2016/0333449 A1 Nov. 17, 2016

(30) Foreign Application Priority Data

Jan. 16, 2014 (EP) .................................... 14151408
Jan. 16, 2014 (SE) .................................... 1450040-9

(51) Int. Cl.
*C22C 38/46* (2006.01)
*C21D 1/18* (2006.01)
*C21D 6/00* (2006.01)
*C21D 9/22* (2006.01)
*C22C 38/00* (2006.01)
*C22C 38/02* (2006.01)
*C22C 38/04* (2006.01)
*C22C 38/06* (2006.01)
*C22C 38/44* (2006.01)
*C22C 38/60* (2006.01)
*B23B 29/04* (2006.01)

(52) U.S. Cl.
CPC ............. *C22C 38/46* (2013.01); *C21D 1/18* (2013.01); *C21D 6/002* (2013.01); *C21D 6/005* (2013.01); *C21D 6/008* (2013.01); *C21D 9/22* (2013.01); *C22C 38/001* (2013.01); *C22C 38/02* (2013.01); *C22C 38/04* (2013.01); *C22C 38/06* (2013.01); *C22C 38/44* (2013.01); *C22C 38/60* (2013.01); *B23B 29/04* (2013.01)

(58) Field of Classification Search
CPC ....... C22C 38/001; C22C 38/02; C22C 38/04; C22C 38/06; C22C 38/44; C22C 38/46; C22C 38/60
See application file for complete search history.

(56) References Cited

U.S. PATENT DOCUMENTS

| 2,624,103 A * | 1/1953 | Bader ................. B23B 27/1688 407/87 |
| 2,697,272 A * | 12/1954 | Clark ...................... B23B 27/16 407/5 |
| 4,848,199 A * | 7/1989 | Kelm ...................... B23B 27/00 82/159 |
| 4,922,698 A * | 5/1990 | Taylor .................. A01D 34/733 56/295 |
| 5,650,024 A | 7/1997 | Hasegawa et al. |
| 6,896,847 B2 * | 5/2005 | Sandberg ................. C21D 1/18 420/69 |
| 7,553,113 B2 * | 6/2009 | Omori ................... B23B 27/141 407/113 |
| 2002/0170638 A1 | 11/2002 | Shimizu et al. |
| 2007/0000576 A1 * | 1/2007 | Blanke .................. C22C 38/004 148/327 |
| 2007/0006949 A1 * | 1/2007 | Sandberg ................ C22C 38/04 148/609 |
| 2009/0010795 A1 * | 1/2009 | Tidesten ............. C22C 33/0285 420/110 |
| 2010/0276038 A1 | 11/2010 | Grellier |
| 2011/0073222 A1 * | 3/2011 | Strandell .................. C21D 1/10 148/575 |
| 2012/0273092 A1 * | 11/2012 | Ratte ....................... C21D 1/06 148/325 |

FOREIGN PATENT DOCUMENTS

| CN | 1436251 A | 8/2003 |
| CN | 1478151 A | 2/2004 |
| CN | 1557985 A | 12/2004 |
| CN | 102102164 A | 6/2011 |
| EP | 0472305 A1 | 2/1992 |
| EP | 2664684 A2 | 11/2013 |
| JP | S5773171 A | 5/1982 |
| JP | H07278761 A | 10/1995 |

(Continued)

OTHER PUBLICATIONS

Machine Translation of JP 2011-202237 (Year: 2018).*
Taiwanese Office Action dated Feb. 3, 2018, for Taiwanese Patent Application No. 104100037.
Extended European Search Report dated Oct. 11, 2017, for European Patent Application No. 14879215.3.
Chinese Office Action dated Nov. 16, 2017, for Chinese Patent Application No. 201480073449.9.
Zhang Zhaolong et al., "Metal Technology," Beijing Institute of Technology Press, Jan. 31, 2013, pp. 80-81.

(Continued)

*Primary Examiner* — Alexandra M Moore
(74) *Attorney, Agent, or Firm* — KARCESKI IP LAW, PLLC

(57) ABSTRACT

The invention relates to a stainless steel intended for cutting tool bodies or holders for cutting tools and a cutting tool body made of the stainless steel. The stainless steel includes the following, in weight %: C 0.14-0.25, N 0.06-0.15, Si 0.7-1.2, Mn 0.3-1.0, Cr 12-15, Ni 0.3-0.8, Mo 0.05-0.4, V 0.05-0.4, Al 0.001-0.3, and optional components and balance Fe apart from impurities.

10 Claims, No Drawings

(56) References Cited

FOREIGN PATENT DOCUMENTS

| | | | | |
|---|---|---|---|---|
| JP | H1018001 | A | 1/1998 | |
| JP | H11229093 | A | 8/1999 | |
| JP | H11279708 | A | 10/1999 | |
| JP | 2000233294 | A | 8/2000 | |
| JP | 2004503677 | A | 2/2004 | |
| JP | 2004515654 | A | 5/2004 | |
| JP | 2005118929 | A | 5/2005 | |
| JP | 2008163452 | A | 7/2008 | |
| JP | 2010503770 | A | 2/2010 | |
| JP | 2010539325 | A | 12/2010 | |
| JP | 2011202237 | A * | 10/2011 | ............. C22C 38/00 |
| RU | 2061781 | A | 6/1996 | |
| RU | 2425170 | A | 9/2012 | |
| RU | 2496907 | A | 10/2013 | |
| SU | 1217918 | A1 | 3/1986 | |
| WO | WO 9749838 | A1 | 12/1997 | |
| WO | WO 0196626 | A1 | 12/2001 | |
| WO | WO 0248418 | A1 | 6/2002 | |
| WO | WO 2009116933 | A1 | 9/2009 | |
| WO | WO-2010044740 | A1 * | 4/2010 | ......... C22C 33/0257 |
| WO | 2012119925 | A1 | 9/2012 | |
| WO | 2015108466 | A1 | 7/2015 | |

OTHER PUBLICATIONS

International Search Report and Written Opinion dated Apr. 21, 2015, for International Patent Application No. PCT/SE2014/051578.
Chinese Office Action dated Jun. 8, 2018, for Chinese Patent Application No. 201480073449.9.
Russian Office Action dated Aug. 21, 2018, for Russian Patent Application No. 2016131191/02(048452).
European Search Report dated May 6, 2014, for European Patent Application No. 14152408.
Chinese Office Action dated May 31, 2017, for Chinese Patent Application No. 201480073449.9.
Japanese Office Action dated Dec. 25, 2018, for Japanese Patent Application No. 2016-546986.
Brazil Office Action dated Jul. 30, 2019, for Brazil Patent Application No. BR 11 2016 016441-5.
Chinese Office Action dated Aug. 1, 2019, for Chinese Patent Application No. 201480073449.9.
Japanese Office Action dated May 28, 2019, for Japanese Patent Application No. 2016-546986.
Chinese Notification of Reexamination dated Mar. 16, 2021, for Chinese Patent Application No. 201480073449.9.
Common Knowledge Evidence 1: edited by Li Qi et al., Mold Materials and Heat Treatment, 2nd Edition, Chapter 6, Introduction to Die Steel, p. 232, Beijing Institute of Technology Press, Aug. 2009.
Common Knowledge Evidence 2: M.G. Fontana et al., Corrosion Engineering, 2nd Edition, p. 158, Table 5-2, Chemical Composition ofStainless Steel, Chemical Industry Press, Aug. 1982.
Common Knowledge Evidence 3: Zhiqiang Zhu etc. , "Chemical and Physical Detection of Steel Analysis", Section 1.3.11, "The role of aluminum in steel" on p. 12, Metallurgical Industry Press, Jun. 2013.
Common Knowledge Evidence 4: edited by Xu Jin et al., Die Steel, "2.1.3 Factors of die steels in terms of internal metallurgical quality to beconsidered" on p. 22, Metallurgical Industry Press, Oct. 1998.
Korean Office Action dated Jun. 16, 2021, for Korean Patent Application No. 10-2016-7022344.

* cited by examiner

STAINLESS STEEL AND A CUTTING TOOL BODY MADE OF THE STAINLESS STEEL

CROSS-REFERENCE TO RELATED APPLICATION(S)

This is a National Stage Entry into the United States Patent and Trademark Office from International PCT Patent Application No. PCT/SE2014/051578, having an international filing date of Dec. 30, 2014, and which claims priority to both Swedish Patent Application No. SE 1450040-9, filed Jan. 16, 2014, and European Patent Application No. EP 14151408.3, filed Jan. 16, 2014, the entire contents of both of which are incorporated herein by reference.

TECHNICAL FIELD

The invention relates to a stainless steel and a cutting tool body made of the stainless steel.

The steel is intended for cutting tool bodies or holders for cutting tools.

BACKGROUND OF THE INVENTION

The term cutting tool body means the body on or in which the active tool portion is mounted at the cutting operation. Typical cutting tool bodies are milling and drill bodies, which are provided with active cutting elements of high speed steel, cemented carbide, cubic boron nitride (CBN) or ceramic. The material in such cutting tool bodies is usually steel, within the art of designated holder steel.

Many types of cutting tool bodies have a very complicated shape and often there are small threaded holes and long, small drilled holes, and therefore the material must have a good machinability. The cutting operation takes place at high cutting speeds, which implies that the cutting tool body may become very hot, and therefore it is important that the material has a good hot hardness and resistance to softening at elevated temperatures. To withstand the high pulsating loads, which certain types of cutting tool bodies, such as milling bodies are subjected to, the material must have good mechanical properties, including a good toughness and fatigue strength. To improve the fatigue strength, compressive stresses are commonly introduced in the surface of the cutting tool body. The material should therefore have a good ability to maintain said applied compressive stresses at high temperatures, i.e. a good resistance against relaxation. Cutting tool bodies are tough hardened, while the surfaces against which the clamping elements are applied can be induction hardened. Therefore the material shall be possible to harden by induction hardening. Certain types of the cutting tool bodies, such as certain drill bodies with soldered cemented carbide tips, are coated with PVD or subjected to nitriding after hardening in order to increase the resistance against chip wear in the chip flute and on the drill body. The material shall therefore be possible to coat with PVD or to subject to nitriding on the surface without any significant reduction of the hardness.

Traditionally, low and medium alloyed engineering steels like 1.2721, 1.2738 and SS2541 have been used as material for cutting tool bodies.

It is also known to use hot work tool steel as a material for cutting tool holders. WO 97/49838 and WO 2009/116933 disclose the use of a hot work tool steels for cutting tool holders. Presently, two popular hot work tool steels used for cutting tool bodies are provided by Uddeholms AB and sold under the names THG 2000 and MCG 4M. The nominal compositions of said steels are given in Table 1 (wt. %).

TABLE 1

| Steel | C | Si | Mn | Cr | Ni | Mo | V |
|---|---|---|---|---|---|---|---|
| THG 2000 | 0.39 | 1.05 | 0.4 | 5.3 | — | 1.3 | 0.9 |
| MCG 4M | 0.30 | 0.4 | 1.2 | 2.3 | 4.00 | 0.8 | 0.8 |

These types of hot work tool steels possess very good properties for the intended use as cutting tool holders. However, hot work tool steels are comparably difficult to machine. The machining expenses often account for more than 60% of the total cost of the machined component. It is obvious that reduced machining time reduces lead-time, lowers labour costs and improves machine use.

It is also known to use stainless steel, in particular pre-hardened 400 series stainless steel like DIN 1.2316 as a material for cutting tool holders. However, these steels are prone to carbide segregation and to the formation of delta ferrite. Retained austenite may also be present in the hardened and tempered condition. The mechanical properties are therefore not optimal for tool holder applications and the steels are also difficult to machine.

US 2007/0006949 A1 discloses a steel for holders and holder details for plastic moulding tools which contains 0.06-0.15% C, 0.07-0.15% N, 0.1-1.0% Si, 0.1-2.0% Mn 12.5-14.5% Cr, 0.8-2.5% Ni, 0.1-1.5% Mo and optionally up to 0.7% V.

DISCLOSURE OF THE INVENTION

The general object of the present invention is to provide a stainless steel, which is suitable as a material for cutting tool bodies and which has a good machinability. The steel should have an improved property profile in the soft annealed condition as well as in the pre-hardened condition.

Another object is to provide a cutting tool holder, in particular for indexable inserts, made from the new stainless steel.

The foregoing objects, as well as additional advantages are achieved to a significant measure by providing a steel having a composition as set out in the alloy claims.

The steel has a property profile fulfilling the continuously increasing requirements for material properties raised by cutting tool manufacturers, toolmakers and end users. In particular the steel is stainless and has an attractive property profile including a good machinability, a good hardenability and a high dimensional stability.

Thanks to the very good property profile of the steel it is also possible to use the steel for other applications such as engineering parts, which are subject to high stresses. The invention relates also to tool holders made from the hot work steel as well as to different uses of the steel.

The invention is defined in the claims.

DETAILED DESCRIPTION

In the following the importance of the separate elements and their interaction with each other as well as the limitations of the chemical ingredients of the claimed alloy are briefly explained. Useful and preferred ranges are defined in the claims. All percentages for the chemical composition of the steel are given in weight % (wt. %) throughout the description.

Carbon (0.14-0.25%)

Carbon is favourable for the hardenability and is to be present in a minimum content of 0.14%, preferably at least 0.19% or 0.20%. At high carbon contents carbides of the type $M_{23}C_6$ and $M_7C_3$ will be formed in the steel. The carbon content shall therefore not exceed 0.25%. The upper limit for carbon may be set to 0.24%, 0.22% or 0.21%.

Nitrogen (0.06-0.15%)

Nitrogen is restricted to 0.06-0.15% in order to obtain the desired type and amount of hard phases, in particular V(C, N). When the nitrogen content is properly balanced against the vanadium content, vanadium rich carbo-nitrides V(C,N) will form. These will be partly dissolved during the austenitizing step and then precipitated during the tempering step as particles of nanometer size. The thermal stability of vanadium carbo-nitrides is considered to be better than that of vanadium carbides, hence the tempering resistance of the stainless tool steel may be improved. Further, by tempering at least twice, the tempering curve will have a higher secondary peak. A preferred range of N is therefore 0.09-0.12%.

Silicon (0.7-1.2%)

Silicon is used for deoxidation. Si increases the activity of carbon in the steel. Si also improves the machinability of the steel. In order to get the desired effect the content of Si should be at least 0.7%, preferably 0.8% or 0.85%. However, Si is a strong ferrite former and should therefore be limited to ≤1.2%, preferably to 1.1%, 1.0% or 0.95%.

Manganese (0.3-1.0%)

Manganese contributes to improving the hardenability of the steel and together with sulphur manganese contribute to improve the machinability by forming manganese sulphides. Manganese shall therefore be present in a minimum content of 0.3%, preferably at least 0.3%. Manganese is an austenite stabilizing element and the content should be limited to 1.0%, 0.8% or 0.6% in order to avoid too much residual austenite. Preferred ranges includes 0.35-0.55% and 0.4-0.5%.

Chromium (12-15%)

When present in a dissolved amount of at least 11%, chromium results in the formation of a passive film on the steel surface. Chromium shall be present in the steel in an amount between 12 and 15% in order to give the steel a good hardenability and corrosion resistance. Preferably, Cr is present in an amount of more than 13% in order to safeguard a good pitting corrosion resistance. The lower limit is set in accordance to the intended application and may be 13.2% or 13.4%. However, Cr is a strong ferrite former and in order to avoid ferrite after hardening the amount need to be controlled. For practical reasons the upper limit may be reduced to 14%, 13.8% or 13.6%. Preferred ranges include 13.2-13.8% and 13.4-13.6%.

Nickel (0.3-0.8%)

Nickel gives the steel a good hardenability and toughness. Because of the expense, the nickel content of the steel should be limited. A preferred range is 0.5-0.7%.

Molybdenum (0.05-0.4%)

Mo is known to have a very favourable effect on the hardenability. It is also known to improve the pitting corrosion resistance. The minimum content is 0.05%, and may be set to 0.15% or 0.17%. Molybdenum is a strong carbide forming element and also a strong ferrite former. The maximum content of molybdenum is therefore 0.4%. Preferably Mo is limited to 0.30%, 0.25% or even 0.23%.

Vanadium (0.05-0.4%)

Vanadium forms evenly distributed primary precipitated carbonitrides of the type M(C,N) in the matrix of the steel. In the present steels M is mainly vanadium but significant amounts of Cr and Mo may be present. Vanadium shall therefore be present in an amount of 0.05-0.4%. The upper limit may be set to 0.35%, 0.30% or 0.28%. The lower limit may be set to 0.10%, 0.15%, 0.20% or 0.22%. The upper and lower limits may be freely combined within the limits set out in claim 1.

Aluminium (0.001-0.3%)

Aluminium is used for deoxidation. In most cases the aluminium content is limited to 0.05%. Suitable upper limits are 0.06%, 0.03% and 0.024%. Suitable lower limits set to ensure a sufficient deoxidation are 0.005% and 0.01%. Preferably the steel contains 0.01 to 0.024% Al.

Copper (≤3.0%)

Cu is an optional element, which may contribute to increasing the hardness and the corrosion resistance of the steel. In addition, it contributes to the corrosion resistance of the steel as well as to the machinability. If used, preferred ranges are 0.02-2%, 0.02-0.5%, 0.04-1.6% and 0.04-0.5%. However, it is not possible to extract copper from the steel once it has been added. This drastically makes the scrap handling more difficult. For this reason, copper is normally not deliberately added.

Cobalt (≤5.0%)

Co is an optional element. It contributes to increase the hardness of the martensite. The maximum amount is 5%. However, for practical reasons such as scrap handling there is no deliberate addition of Co. A preferred maximum content is 0.2%.

Tungsten (≤0.5%)

Tungsten may be present at contents of up to 0.5% without being detrimental to the properties of the steel. However, tungsten tends to segregate during solidification and may give rise to undesired delta ferrite. In addition, tungsten is expensive and it also complicates the handling of scrap metal. The maximum amount is therefore limited to 0.5%, preferably 0.2% and most preferably no additions are made.

Niobium (≤0.1%)

Niobium is similar to vanadium in that it forms carbonitrides of the type M(C,N). The maximum addition of Nb is 0.1%. Preferably, no niobium is added.

Phosphorus (≤0.05%)

P is an impurity element which may cause temper brittleness. It is therefore limited to ≤0.05%.

Sulphur (≤0.5%)

Sulphur is preferably limited to S≤0.005% in order to reduce the number of inclusions. However, S contributes to improving the machinability of the steel. A suitable content for improving the machinability of the steel in the tough hardened condition is 0.07-0.15%. At high sulphur contents there is a risk for red brittleness. Moreover, a high sulphur content may have a negative effect on the fatigue properties of the steel. The steel shall therefore contain ≤0.5%, preferably ≤0.01% most preferably ≤0.001%.

Oxygen (Optionally 0.003-0.01%)

Oxygen may be deliberately added to the steel during ladle treatment in order to form a desired amount of oxide inclusions in the steel and thereby improve the machinability of the steel. The oxygen content is controlled to fall in the range of 0.003-0.01%. A preferred range is 0.003-0.007%.

Calcium (Optionally 0.0003-0.009%)

Calcium may be deliberately added to the steel during ladle treatment in order to form inclusions of a desired composition and shape. Calcium is then added in amounts of 0.0003-0.009, preferably 0.0005-0.005.

Be, Se, Mg and REM (Rare Earth Metals)

These elements may be added to the steel in the claimed amounts in order to further improve the machinability, hot workability and/or weldability.

Boron (≤0.01%)

B may be used in order to further increase the hardness of the steel. The amount is limited to 0.01%, preferably ≤0.004%.

Ti, Zr and Ta

These elements are carbide formers and may be present in the alloy in the claimed ranges for altering the composition of the hard phases. However, normally none of these elements are added.

PRE

The pitting resistance equivalent (PRE) is often used to quantify pitting corrosion resistance of stainless steels. A higher value indicates a higher resistance to pitting corrosion. For high nitrogen martensitic stainless steels the following expression may be used:

$$PRE = \% \, Cr + 3.3\% \, Mo + 30\% \, N$$

wherein % Cr, % Mo and % N are the contents dissolved in the matrix at the austenitizing temperature ($T_A$). The dissolved contents can be calculated with Thermo-Calc for the actual austenitizing temperature ($T_A$) and/or measured in the steel after quenching.

The austenitizing temperature (TA) is in the range of 950-1200° C., typically 1000-1050° C. Preferably, the PRE-number is in the range of 16-18.

Steel Production

A stainless steel having the claimed chemical composition can be produced by conventional steel making. This type of steel is often made by melting scrap in an Electric Arc Furnace (EAF) then subjecting the steel to ladle metallurgy and, optionally, a vacuum degassing. The oxygen content is increased in the steel ladle by stirring the melt and exposing the melt surface to the atmosphere and/or by the addition of mill scale. Calcium is added at the end of the metallurgical treatment, preferably as CaSi.

The melt is cast to ingots by ingot casting, suitably bottom casting. Powder metallurgical (PM) manufacture can be used as well as Electro Slag Remelting (ESR). However, for cost reasons these alternatives are normally not used.

The steel can be heat treated to adjust the hardness in a similar way as used for type 420 series stainless steel. The hardening temperature range is 1000° C.-1030° C. because exceeding 1030° C. will give grain growth and increased retained austenite content. The holding time should be about 30 minutes. A temperature of 1020° C. is preferred. The steel should be tempered two times with intermediate cooling to room temperature. Holding time at the tempering temperature should be minimum 2 hours. The lowest tempering temperature that should be used is 250° C.

When using 1020° C. as hardening temperature a hardness of 48-50 HRC can be reached after tempering at 250° C. A hardness of 46-48 HRC can be reached after tempering at 520° C. The latter treatment removes retained austenite and gives dimensional changes close to zero.

Example 1

A steel composition according to the invention was prepared by conventional metallurgy. The comparative steel was a standard 1.2316 which was delivered with a hardness of 310 HB, which corresponds to about 33 HRC.

The compositions of the examined steels are given in Table 2 (in wt. %) balance Fe apart from impurities.

The inventive steel was subjected to hardening by austenitzing at 1020° C. for 30 minutes and tempered twice for two hours at 550° C. to obtain a hardness of 40 HRC. The comparative steel was also subjected to hardening and tempering to the same hardness.

TABLE 2

Compositions of the examined steels.

| Element | Inventive steel | Comparative steel 1.2316 |
|---|---|---|
| C | 0.21 | 0.38 |
| Si | 0.9 | 0.6 |
| Mn | 0.45 | 0.65 |
| Cr | 13.5 | 16.0 |
| Ni | 0.6 | 0.85 |
| Mo | 0.2 | 1.15 |
| V | 0.25 | |
| Al | 0.02 | 0.01 |
| N | 0.10 | 0.004 |

Machinability Testing

Machinability is a complex topic and may be assessed by a number of different tests for different characteristics. The main characteristics are: tool life, limiting rate of material removal, cutting forces, machined surface and chip breaking. In the present case the machinability of the steel was examined by end milling, since this is one of the toughest operations in tool body manufacture.

The steels shown in Table 2 were subjected to milling tests in order to assess their machinability. The steels were not treated with any machinability enhancing elements.

All machinability tests were carried out on a MODIG 7200 vertical machining center.

End Milling with Indexible Insert Cutter

In this test a diameter 16 mm cutter has been used, and the test has been performed under the following conditions.

Cutting tool: Sandvik CoroMill 390 Ø 16 mm
Carbide insert: R390-11 T3 08M-PL 1030
Cutting speed, Vc: 200 m/min
Axial depth of cut, ap: 4 mm
Radial depth of cut, ae: 0.8 mm
Tooth feed, fz: 0.2 mm/tooth
Coolant: Dry milling The tool life until a maximum wear of 0.3 mm, when milling in the different materials are presented in table 3.

TABLE 3

Results from end milling with indexible insert cutter

| Tested steel | Tool life (min.) |
|---|---|
| 1.2316 310 HB | 90 |
| 1.2316 40 HRC | 23 |
| Inventive steel 40 HRC | 175 |

In the milling tests flank wear was measured on each of the teeth of the milling cutters using light optical microscope and an average value was calculated. The tests were stopped when the average flank wear value reached 0.3 mm, and the milling time was noted and used for machinability comparison.

End Milling with Solid Cemented Carbide Cutter

In this test a diameter 10 mm solid cemented carbide cutter has been used, and the test has been performed under the following conditions:

Cutting tool: Sandvik R216.34-10050-AK22P-1630 Ø 10 mm

Cutting speed, Vc: 45 m/min

Axial depth of cut, ap: 4 mm

Radial depth of cut, ae: 8 mm

Tooth feed, fz: 0.03 mm/tooth

Coolant: Dry milling

The tool life until a maximum wear of 0.2 mm, when milling in the different materials are presented in table 4.

TABLE 4

Results from end milling with solid cemented carbide cutter

| Tested steel | Tool life (min.) |
| --- | --- |
| 1.2316 310 HB | 418 |
| 1.2316 40 HRC | 97 |
| Inventive steel 40 HRC | 480 |

Face Milling with Indexible Insert Milling Cutter

In this test a diameter 80 mm cutter has been used, and the test has been performed under the following conditions:

Cutting tool: Sandvik CoroMill 245 Ø 80 mm

Carbide insert: R245-12 T3 E-PL 4230

Cutting speed, Vc: 150 m/min

Axial depth of cut, ap: 2 mm

Radial depth of cut, ae: 48 mm

Tooth feed, fz: 0.15 mm/tooth

Coolant: Dry milling

The tool life until a maximum wear of 0.3 mm, when milling in the different materials are presented in table 5.

TABLE 5

Results from face milling with indexible insert milling cutter

| Tested steel | Tool life (min.) |
| --- | --- |
| 1.2316 310 HB | 25 |
| 1.2316 40 HRC | 11 |
| Inventive steel 40 HRC | 30 |

The results of the performed tests clearly revealed an unexpected and remarkable improvement in the machinability of the inventive material, in particular in the pre-hardened condition. An improvement of the tool life of up to nearly 8 times the tool life of 1.2316 was experienced in the end milling with indexible insert cutter.

The reasons for the improvements are not fully understood and the inventors do not want to be bound by any theory. However, it is believed that results are linked to the leaner steel composition. The lower Cr and Mo content of the claimed steels results in a very low amount of primary carbides and a more uniform matrix structure. Carbide stringers were found in the microstructure of the comparative steel only.

Example 2

Steels having the composition shown in Table 2 were subjected to unnotched impact testing in the short transverse direction. The results are shown in table 6.

TABLE 6

Results from ductility testing

| Tested steel | Ductility (Joule) |
| --- | --- |
| 1.2316 310 HB | 20 |
| Inventive steel 40 HRC | 190 |

It is apparent that the comparative steel 1.2316 has a much lower ductility, although it had a lower hardness of about 33 HRC. The reason for this is probably the existence of carbides, which are concentrated in the segregated areas.

The same steels were also tested for corrosion resistance.

The corrosion resistance of the inventive steel was compared that of 1.2316, which has higher contents of Cr and Mo. Test specimens were placed in a climate chamber for 3 weeks. The cycle used was 55° C./5 h+19° C./5 h with 90% humidity.

In addition, a polarization test was done in 0.5 M $H_2SO_4$ purged with nitrogen pH 1.2 and at a temperature of 22° C. The polarization curve revealed that the inventive steel is slightly less corrosion resistant than the comparative steel.

The result of these tests is shown as a relative corrosion resistance in table 7.

TABLE 7

Results from corrosion testing

| Tested steel | Relative corrosion resistance (%) |
| --- | --- |
| 1.2316 310 HB | 100 |
| Inventive steel 40 HRC | 80 |

It is apparent from the examples 1 and 2, that the inventive steel has a higher ductility and a better machinability than the comparative steel, even when hardened to a higher hardness. Although the corrosion resistance is slightly less good, it is uncertain if this difference can be detected in real applications. By a tempering treatment at a temperature of 500° C. or higher it is also possible to remove all retained austenite and thereby obtain a dimensional change close to zero. Accordingly, the inventive steel has a property profile, which is well suited for the use of the steel to tool holders.

The stainless steel of the present invention is particular useful for cutting tool bodies or holders for cutting tools. Indexable insert cutting tool bodies undergo high dynamic stresses during service and therefore fatigue strength is of vital importance. For this reason it is suitable to introduce compressive residual stresses in the surface in order to prolong the service life of the tool body. This can be done by hard machining or any conventional means such as shot peening, nitriding and/or oxy-nitriding. Preferably, the cutting tool body is provided with compressive residual stresses in the range of −200 MPa to −900 MPa from the surface to a depth of 75 μm below the surface. This method can not only be used for tool holders, but also for extending the fatigue life of any other part or component formed from the claimed stainless steel such as milling chucks, collets, tool tapers or clamp jaws.

The invention claimed is:

1. A cutting tool holder for indexable inserts, wherein the cutting tool holder consists of a pre-hardened stainless steel consisting of, in weight % (wt. %):

C 0.14-0.25

N 0.06-0.15

Si 0.7-1.2

Mn 0.3-1.0
Cr 12-15
Ni 0.3-0.8
Mo 0.05-0.4
V 0.22-0.4
Al 0.001-0.3
S≤0.005
optionally
P≤0.05
Cu≤3
Co≤5
W≤0.5
Nb≤0.1
Ti≤0.1
Zr≤0.1
Ta≤0.1
B≤0.01
Be≤0.2
Se≤0.3
Ca 0.0003-0.009
O 0.003-0.01
Mg≤0.01
REM≤0.2, and
balance Fe apart from impurities,
wherein the pre-hardened stainless steel contains a content of residual austenite that is less than 15 volume %, and
wherein the cutting tool holder has a hardness of 40-52 HRC.

2. The cutting tool holder for indexable inserts according to claim 1, wherein the cutting tool holder consists of a pre-hardened stainless steel containing, in weight % (wt. %):
C 0.14-0.24
Mn 0.3-0.8
Cr 12.5-14.8, and
Mo 0.15-0.35.

3. The cutting tool holder for indexable inserts according to claim 1, wherein the cutting tool holder consists of a pre-hardened stainless steel containing, in weight % (wt. %):
Mn 0.3-0.6.

4. The cutting tool holder for indexable inserts according claim 1, wherein the cutting tool holder consists of a pre-hardened stainless steel fulfilling at least one of the following requirements (in wt. %):
C 0.19-0.22
N 0.09-0.12
Si 0.8-1.1
Mn 0.35-0.60
Cr 13.0-14.5
Ni 0.35-0.75
Mo 0.15-0.30
V 0.22-0.3
Al 0.005-0.06
Cu≤0.3
Ti≤0.005
Nb≤0.008, and
P≤0.025.

5. The cutting tool holder for indexable inserts according to claim 1, wherein the cutting tool holder consists of a pre-hardened stainless steel fulfilling at least one of the following requirements (in wt. %):
C 0.19-0.21
N 0.09-0.11
(C+N) 0.28-0.34
Si 0.8-1.0
Mn 0.35-0.75

Cr 13.2-14.0
Ni 0.50-0.70
Mo 0.17-0.25
V 0.22-0.30
Al 0.005-0.024
Cu≤0.2
Ti≤0.004
Nb≤0.005, and
P≤0.020.

6. The cutting tool holder for indexable inserts according to claim 1, wherein the cutting tool holder consists of a pre-hardened stainless steel fulfilling at least one of the following requirements (in wt. %):
C 0.20-0.22
N 0.10-0.12
(C+N) 0.30-0.32
Si 0.85-1.1
Mn 0.30-0.55
Cr 13.2-13.9
Ni 0.50-0.70
Mo 0.15-0.23
V 0.22-0.28, and
Al 0.008-0.03.

7. The cutting tool holder for indexable inserts according to claim 1, wherein the cutting tool holder consists of a pre-hardened stainless steel fulfilling at least one of the following requirements (in wt. %):
C 0.20-0.21
N 0.10-0.11
Si 0.85-1.0
Mn 0.40-0.55
Cr 13.2-13.8
Ni 0.55-0.70
Mo 0.17-0.25
V 0.22-0.30, and
Al 0.01-0.024.

8. The cutting tool holder for indexable inserts according to claim 1, wherein the cutting tool holder consists of a pre-hardened stainless steel fulfilling the following requirements (in wt. %):
C 0.19-0.22
N 0.09-0.12
Si 0.8-1.1
Mn 0.35-0.60
Cr 13.0-14.5
Ni 0.35-0.75
Mo 0.15-0.30
V 0.22-0.3
Al 0.005-0.03
Cu≤0.3
Ti≤0.005
Nb≤0.008, and
P≤0.025.

9. The cutting tool holder for indexable inserts according to claim 1, wherein the cutting tool holder consists of a pre-hardened stainless steel fulfilling at least one of the following requirements (in wt. %):
Cr 13.4-13.6
Ni 0.55-0.65
Mo 0.17-0.23, and
V 0.22-0.28.

10. The cutting tool holder for indexable inserts according to claim 1, wherein the pre-hardened stainless steel has a thermal conductivity of at least 21 W/mK at 400° C.

* * * * *